US008903382B2

(12) United States Patent
Swaminathan et al.

(10) Patent No.: US 8,903,382 B2
(45) Date of Patent: Dec. 2, 2014

(54) METHOD AND APPARATUS FOR MULTI-MODE SYSTEM SELECTION

(75) Inventors: Arvind Swaminathan, San Diego, CA (US); Srinivasan Balasubramanian, San Diego, CA (US); Thomas Klingenbrunn, San Diego, CA (US); Shyamal Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 12/859,117

(22) Filed: Aug. 18, 2010

(65) Prior Publication Data

US 2011/0207473 A1    Aug. 25, 2011

Related U.S. Application Data

(60) Provisional application No. 61/235,647, filed on Aug. 20, 2009.

(51) Int. Cl.
*H04W 4/00* (2009.01)
*H04W 48/16* (2009.01)
*H04W 52/02* (2009.01)
*H04W 48/18* (2009.01)
*H04W 8/00* (2009.01)
*H04W 64/00* (2009.01)

(52) U.S. Cl.
CPC .............. *H04W 48/16* (2013.01); *H04W 48/18* (2013.01); *H04W 8/005* (2013.01); *H04W 64/006* (2013.01); *H04W 52/0229* (2013.01); *H04W 52/0254* (2013.01)
USPC ...................... 455/434; 455/435.1; 455/435.2; 455/456.1; 455/456.2; 455/456.6; 455/552.1; 455/574; 370/311; 370/328; 370/329; 370/330

(58) Field of Classification Search
CPC ...... H04W 48/16; H04W 88/06; H04W 48/18; H04W 64/00; H04W 8/005; H04W 36/14; H04W 64/006; H04W 36/08; Y02B 60/50
USPC ............. 455/434, 435.1, 435.2, 456.1, 456.2, 455/456.3, 456.6, 574, 161.1; 370/311, 370/328, 329, 330
See application file for complete search history.

(56) References Cited

U.S. PATENT DOCUMENTS 7,123,928 B2 * 10/2006 Moeglein et al. .......... 455/456.3
7,792,554 B2 *  9/2010 Abdel-Kader ................ 455/574

(Continued)

FOREIGN PATENT DOCUMENTS

EP      1962454      8/2008
JP      2002199428 A   7/2002
JP      2004356684 A  12/2004

OTHER PUBLICATIONS

Taiwan Search Report—TW099127980—TIPO—May 9, 2013.

(Continued)

*Primary Examiner* — Olumide T Ajibade Akonai
(74) *Attorney, Agent, or Firm* — Anthony R. Morris

(57) ABSTRACT

Devices and methods are provided for optimizing the timing of multi-mode system scans in a wireless communication environment. In one embodiment, the method may involve determining at least one of location and movement of a mobile entity (ME). The method may involve adjusting a timer between preferred system scans based on the at least one of the location and the movement of the ME. For example, determining may involve utilizing a movement sensor (e.g., an accelerometer and/or a voltage-controlled oscillator accumulator) to detect the movement of the ME, and/or receiving signals from a Global Positioning System or the like.

53 Claims, 15 Drawing Sheets

(56) References Cited

U.S. PATENT DOCUMENTS

| | | | |
|---|---|---|---|
| 7,983,719 B2* | 7/2011 | Abdel-Kader | 455/574 |
| 8,463,269 B2* | 6/2013 | Mubarek et al. | 455/435.3 |
| 8,619,709 B2* | 12/2013 | Umeuchi et al. | 370/331 |
| 2002/0049058 A1* | 4/2002 | Tee | 455/437 |
| 2005/0131607 A1* | 6/2005 | Breed | 701/45 |
| 2006/0282554 A1 | 12/2006 | Jiang et al. | |
| 2007/0207815 A1* | 9/2007 | Alfano et al. | 455/456.1 |
| 2008/0112346 A1 | 5/2008 | Tolpin et al. | |
| 2008/0117862 A1 | 5/2008 | Yeshayahu et al. | |
| 2008/0167047 A1* | 7/2008 | Abedi | 455/442 |
| 2009/0093252 A1* | 4/2009 | Czaja et al. | 455/436 |
| 2009/0131081 A1* | 5/2009 | Abdel-Kader et al. | 455/456.6 |
| 2010/0222055 A1* | 9/2010 | Cho et al. | 455/434 |

OTHER PUBLICATIONS

International Search Report and Written Opinion—PCT/US2010/046229, International Search Authority—European Patent Office—Nov. 17, 2010.

* cited by examiner

METHOD AND APPARATUS FOR MULTI-MODE SYSTEM SELECTION

CLAIM OF PRIORITY UNDER 35 U.S.C. §119

The present Application for Patent claims priority to Provisional Application No. 61/235,647, entitled "METHOD AND APPARATUS TO IMPROVE THE PERFORMANCE OF MULTI-MODE SYSTEM SELECTION," filed Aug. 20, 2009, and is assigned to the assignee hereof, and is hereby expressly incorporated in its entirety by reference herein.

BACKGROUND

1. Field

The present application relates generally to wireless communications, and more specifically to techniques for optimizing the timing of multi-mode system scans.

2. Background

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

With the deployment of a multitude of wireless technologies worldwide and support for these technologies in mobile multimode devices or entities, there is a growing need for seamless system selection toward the goal of global roaming. Furthermore, any particular geographic region may support mixed technologies and networks, such as 3rd Generation Partnership Project (3GPP) and 3rd Generation Partnership Project 2 (3GPP2) technologies.

A mobile multimode device that supports mixed technologies may include multiple databases that are used in selecting optimal networks within a technology. As an example, for 3GPP2 technologies, such as certain Code Division Multiple Access 2000 (cdma2000 or C2K) networks, a Preferred Roaming List (PRL) database which is stored at the UE provides information about which system/network from 3GPP2 technologies is preferred in a geographic region for that device. Whether predetermined or programmed via Over-The-Air (OTA) management protocols, the PRL contains information about the preferred networks and the order in which they should be selected for the user. PRLs for 3GPP2 technologies may be structured to have a table associated with each geographical region, which in turn contains a list of system descriptions keyed by System Identifier/Network Identifier (SID/NID) pairs and associated with an acquisition index. The acquisition index may be used as a pointer to an acquisition table which contains an indexed list of RF channels for channel acquisition purposes in the related system.

On the other hand for 3GPP technologies, such as Global System for Mobile (GSM) and Universal Mobile Telecommunication System (UMTS) Terrestrial Radio Access (UTRA), a differently structured database list of preferred networks, termed Public Land Mobile Networks (PLMNs), is stored in a Subscriber Identity Module (SIM) or Universal Subscriber Identity Module (USIM) of the mobile device. The PLMNs in the database include a Mobile Network Code (MNC) that is used in combination with a Mobile Country Code (MCC) (also known as a "MCC/MNC tuple") to uniquely identify a service operator using a 3GPP technology, such as GSM and UMTS public land mobile networks.

The starting point can be the 3GPP approach to system selection based on PLMN lists, which may include 3GPP2 access technology identifiers (ATI), also known as Radio Access Technologies (RATs). A PLMN may identify and may be a concatenation of a MCC and a MNC. When roaming through geographical locations, it is desirable that a multimode device seamlessly select the best available system, particularly when roaming across areas with different available access technologies (e.g., 3GPP and 3GPP2). Accordingly, there is a need to manage access technology selection for multimode roaming between existing access technologies, as well as possible future access technologies, for seamless and efficient system selection among the access technologies. In particular, there is a need to intelligently manage the timing of preferred system scans in order to achieve a balance between minimizing the acquisition time and minimizing the power spent in performing such scans.

SUMMARY

In accordance with one or more embodiments and corresponding disclosure thereof, various aspects are described in connection with a multi-mode system selection method performed by a mobile entity (ME), such as, for example, an access terminal (AT), sometimes referred to as a user equipment (UE), a wireless communication device, terminal, or the like. The method may involve determining at least one of location and movement of the ME. The method may involve adjusting a timer between preferred system scans based on the at least one of the location and the movement of the ME.

In related aspects, determining may comprise utilizing a movement sensor (e.g., an accelerometer and/or a voltage-controlled oscillator (VCO) accumulator) to detect the movement of the ME. Determining may comprise receiving signals from a Global Positioning System (GPS). In the alternative, or in addition, determining may comprise: (a) obtaining a cell identifier for one of a servicing cell and a neighboring cell; (b) using the cell identifier to access position data of a base station associated with the one of the serving cell and the neighboring cell; and (c) approximating the at least one of the location and the movement of the ME based on the position data of the base station.

In further related aspects, adjusting may comprise decreasing the timer, in response to detecting that the movement meets a minimum movement threshold. Adjusting may comprise increasing the timer, in response to detecting that the movement fails to meet a minimum movement threshold. Adjusting comprises decreasing the timer, in response to detecting at least one of (a) a change in the ME location relative to a previous ME location meets a location change threshold, and (b) a decrease in a distance between the ME and a preferred system. In the alternative, or in addition, adjusting may comprise increasing the timer, in response to detecting that a change in the ME location relative to a previous ME location fails to meet a location change threshold. In yet further related aspects, an electronic device may be configured to execute the above described methodology.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DESCRIPTION

Figure 1:
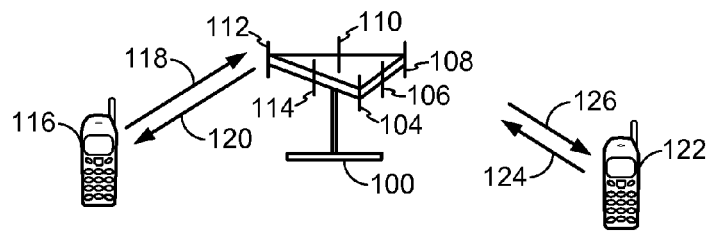
FIG. 1 illustrates a multiple access wireless communication system according to one embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA networks, etc. The terms "networks" and "systems" are often used interchangeably. A CDMA network may implement a radio technology such as Universal Terrestrial Radio Access (UTRA), cdma2000 (C2K), etc. UTRA includes Wideband-CDMA (W-CDMA) and Low Chip Rate (LCR). C2K covers IS-2000 (also known as 1x and 1xRTT), IS-95 and IS-856 standards. TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). C2K is described in documents from an organization named "3rd Generation Partnership Project 2" (3GPP2). These various radio technologies and standards are known in the art.

Single-Carrier Frequency Division Multiple Access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. SC-FDMA is used for uplink multiple access in 3GPP Long Term Evolution (LTE), or Evolved UTRA.

Referring to FIG. 1, a multiple access wireless communication system according to one embodiment is illustrated. An access point 100 (e.g., base station, evolved Node B (eNB), or the like) includes multiple antenna groups, one including 104 and 106, another including 108 and 110, and an additional including 112 and 114. In FIG. 1, two antennas are shown for each antenna group, however, more or fewer antennas may be utilized for each antenna group. A mobile entity (ME) 116, such as, for example, an access terminal (AT) is in communication with the antennas 112 and 114, where the antennas 112 and 114 transmit information to the ME 116 over a forward link 120 and receive information from the ME 116 over a reverse link 118. An ME 122 is in communication with the antennas 106 and 108, where the antennas 106 and 108 transmit information to the ME 122 over a forward link 126 and receive information from the ME 122 over a reverse link 124. In a FDD system, the communication links 118, 120, 124 and 126 may use different frequency for communication. For example, the forward link 120 may use a different frequency than that used by the reverse link 118.

Each group of antennas and/or the area in which they are designed to communicate is often referred to as a sector of the access point. In the embodiment, antenna groups each are designed to communicate to MEs in a sector, of the areas covered by the access point 100.

In communication over the forward links 120 and 126, the transmitting antennas of the access point 100 utilize beamforming in order to improve the signal-to-noise ratio of forward links for the different MEs 116 and 124. Also, an access point using beamforming to transmit to MEs scattered randomly through its coverage causes less interference to MEs in neighboring cells than an access point transmitting through a single antenna to all its MEs.

An access point may be a fixed station used for communicating with the terminals and may also be referred to as an access point, a Node B, an eNB, or some other terminology.

Figure 2:
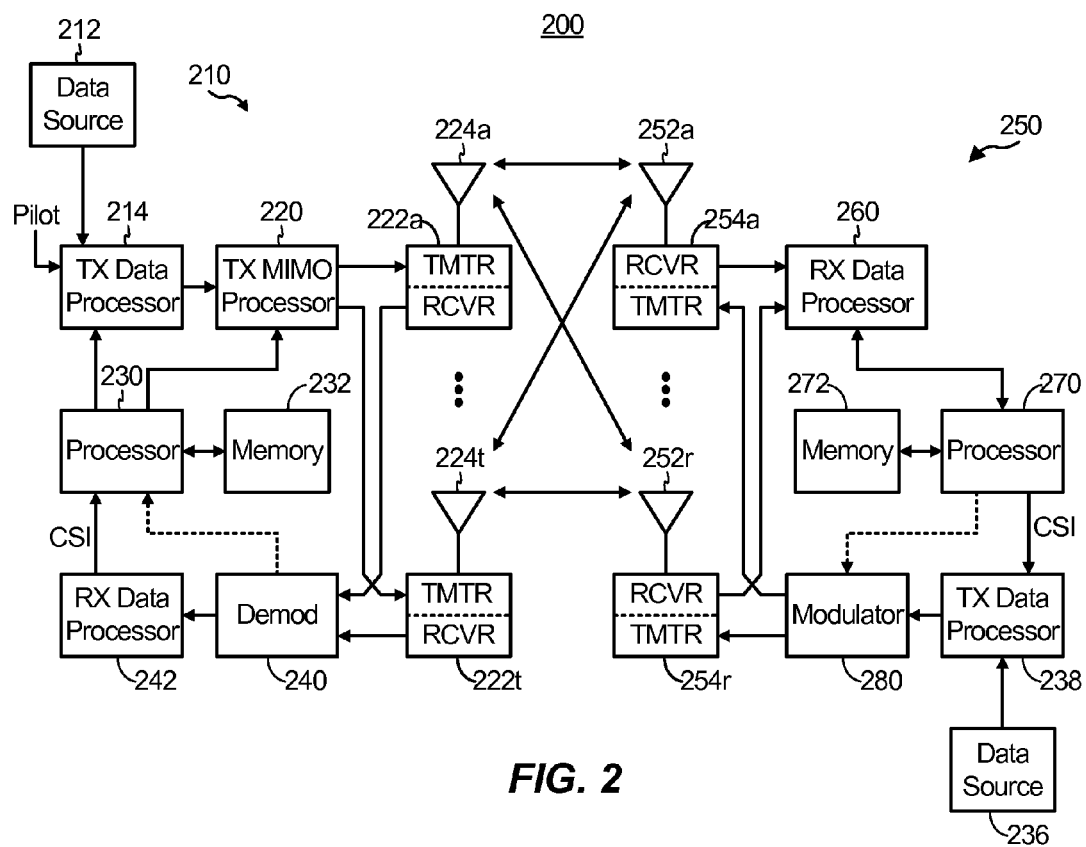
FIG. 2 illustrates a block diagram of a communication system.

FIG. 2 is a block diagram of an embodiment of a transmitter system 210 (also known as an access point) and a receiver system 250 (also known as a ME) in a MIMO system 200. At the transmitter system 210, traffic data for a number of data streams is provided from a data source 212 to a transmit (TX) data processor 214.

In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230, which may be in operative communication with a memory 232.

The modulation symbols for the data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222a through 222t. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At the receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use, discussed further below. The processor 270 formulates a reverse link message comprising a matrix index portion and a rank value portion, and may be in operative communication with a memory 272.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message.

Figure 3:
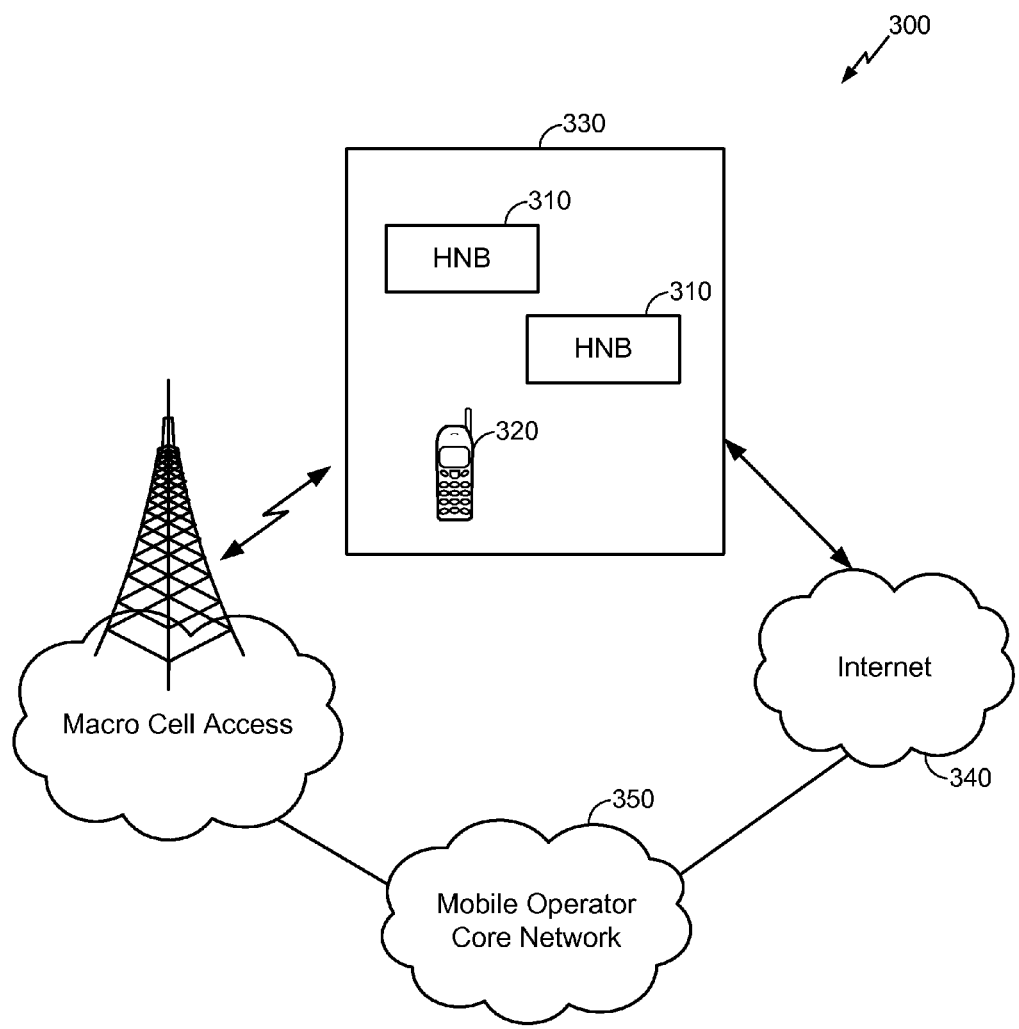
FIG. 3 illustrates an exemplary communication system to enable deployment of access point base stations within a network environment.

FIG. 3 illustrates an exemplary communication system to enable deployment of access point base stations within a network environment. As shown in FIG. 3, the system 300 includes multiple access point base stations or, in the alternative, femto cells, Home Node B units (HNBs), or Home eNB units (HeNBs), such as, for example, HNBs 310, each being installed in a corresponding small scale network environment, such as, for example, in one or more user residences 330, and being configured to serve associated, as well as alien, ME 320. Each HNB 310 is further coupled to the Internet 340 and a mobile operator core network 350 via a DSL router (not shown) or, alternatively, a cable modem (not shown).

In accordance with one or more aspects of the embodiments described herein, there are provided techniques to improve the performance of multi-mode system selection. Upcoming multi-mode mobile entities will be able to communicate over LTE, 1x, Data Optimized (DO), UMTS, GSM, as well as other Radio Access Technologies (RATs). For example, the framework used by the ME to select the best system from among the various systems available in the current location may be referred to as a Multi-Mode System Selection (MMSS) framework or the like. In the following description, for reasons of conciseness and clarity, terminology associated with the 3GPP2 standards, as promulgated by the International Telecommunication Union (ITU), is used. However, it should be emphasized that the techniques described herein are applicable to other technologies, such as the technologies and standards mentioned above.

It is noted that the relative prioritization between a 3GPP system and a 3GPP2 system may be specified using MMSS System Priority List (MSPL) tables or the like. One of the key steps in the MMSS algorithm is to determine the MSPL to use in a ME's current location. The standard way to achieve this is to scan for systems until a system with a Multimode Location association Priority List (MLPL) record is identified. Once this is done, the MSPL to use is the MSPL linked to this MLPL record.

FIGS. 4-8 illustrate techniques for grouping systems that belong to the same geographic area (referred to as a location group). Each location group may be associated with a single MSPL that specifies the rules to rank-order the systems that belong to the location group. Thus, when the ME is scanning for systems, once it discovers a system belonging to a location group, the MSPL to use is known. In addition, all the other systems in the location group can be determined and rank-ordered based on the rules in this associated MSPL.

Figure 4:
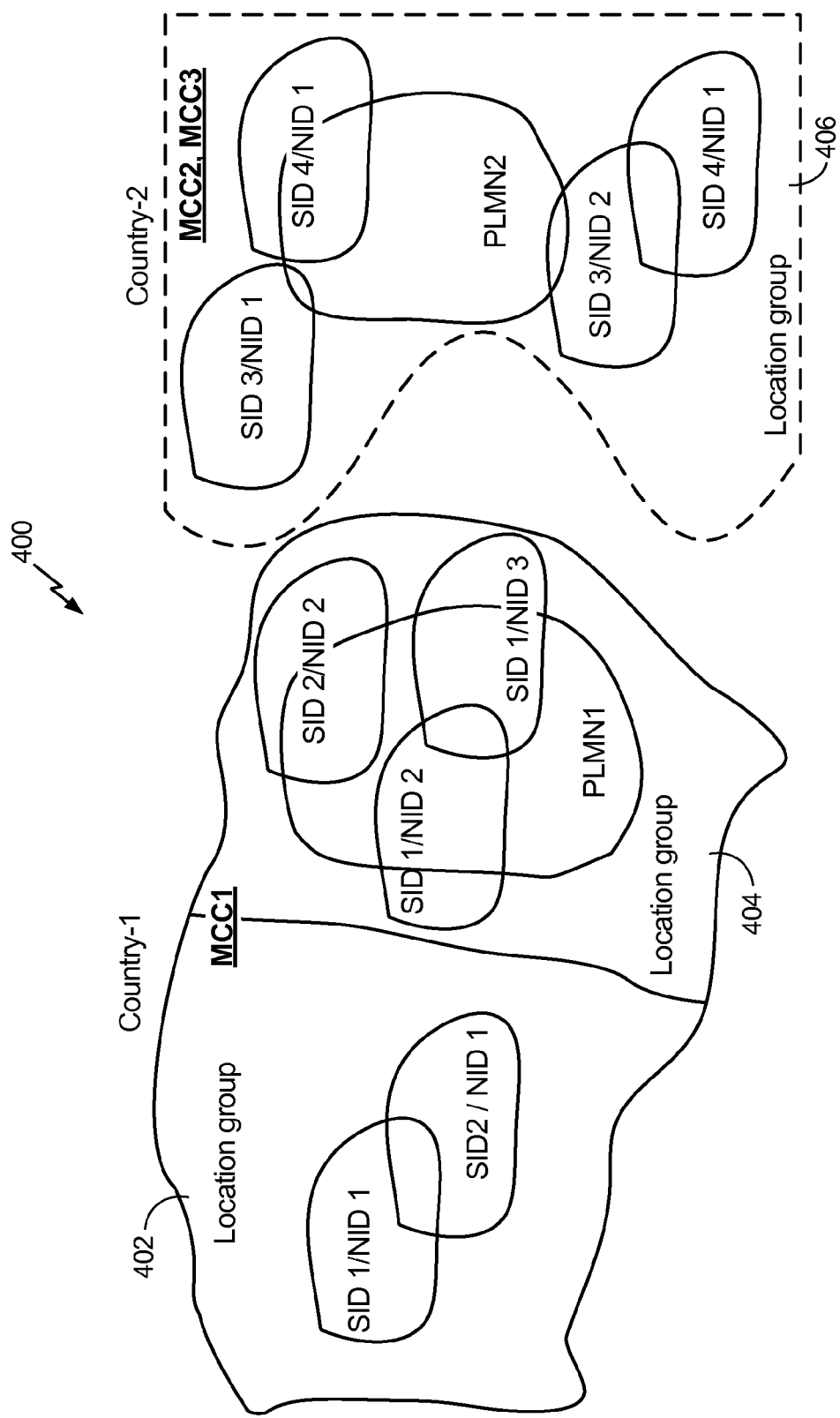
FIG. 4 illustrates exemplary location groups of a communication system.

With reference to FIG. 4, there are shown three location groups 402, 404, and 406 of a wireless network environment 400. Country-2 in the figure has two Mobile Country Codes (MCCs) (i.e., MCC2 and MCC3). It is noted that the size of a location group can vary. A single large country can be split into multiple location groups, or a location group can span an entire country or multiple countries. The size may be determined by weighing the resulting performance benefits against the effort needed to determine the appropriate provisioning.

A benefit of using MSPLs is that it can enable power-efficient scans. The basic idea is that if the ME can determine the group of systems that exist in the same location as a discovered system, it can optimize scans to only look for more preferred systems in this list. For example, since LTE deployment will initially be in hot-spots, properly defined location groups can be used to avoid scanning for LTE in areas where LTE is not present. As such, the step of determining the MSPL to use is equivalent to determining the location group. The exact method used to determine the location group will depend on the provisioned databases. The complexity of the provisioned databases can be adapted depending on the granularity of the location group(s).

Figure 5:
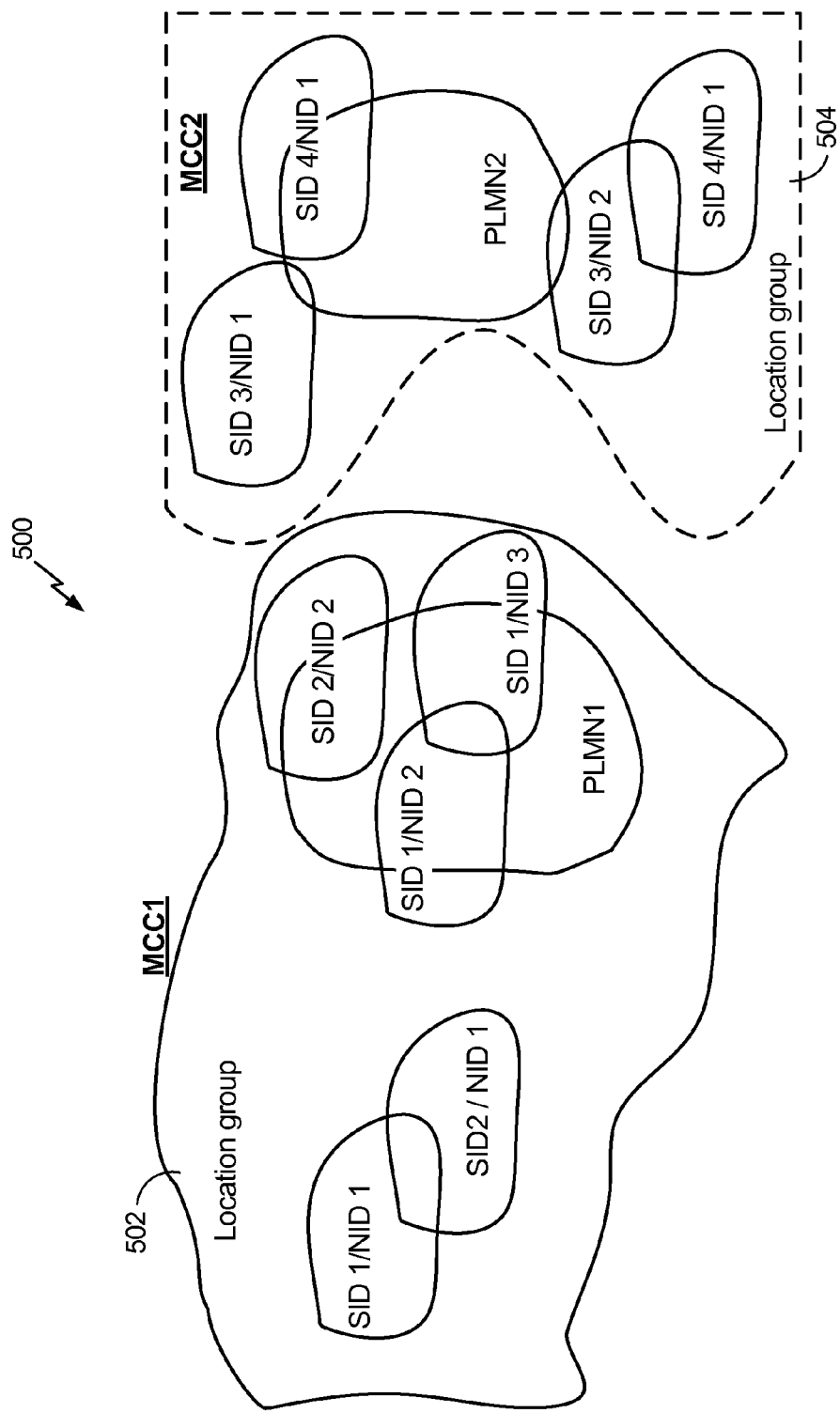
FIG. 5 shows location groups having country-wide scope.

With reference to FIG. 5, there is shown an embodiment of a wireless network environment 500 wherein location groups 502 and 504 has country-wide scope, such as, for example, when MCC-based MLPL records are provisioned. In this case, each location group will be the size of the entire country, as shown in FIG. 5. Exemplary tables that can be provisioned in the ME are shown in FIG. 6, which may include a provisioned PLMN database 602, a provisioned Preferred Roaming List (PRL) 604, a MSPL-1 606, and provisioned MLPL records 608 or similar system priority list records.

Figure 7:
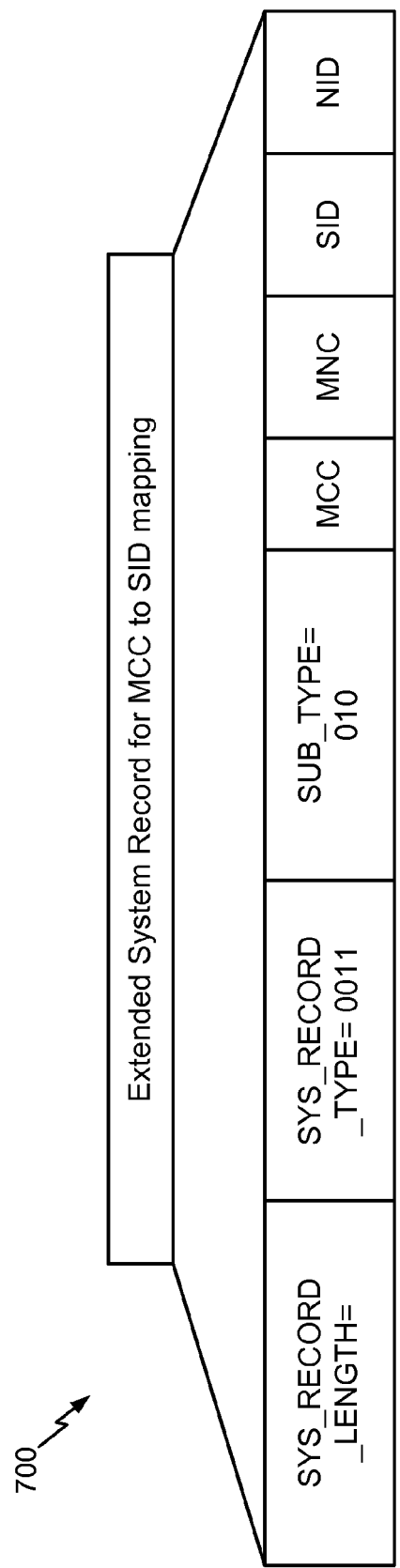
FIG. 7 shows an exemplary extended system record.

In related aspects, the provisioned PRL may use the extended PRL format in which each record has a MCC/MNC in addition to the SID/NID or Subnet ID. The MCC field in each record in a GEO is set to one of the MCCs belonging to the country in which the GEO lies. The MNC field can be wild-carded (assuming that the GEO does not span country boundaries). An exemplary format of the extended PRL 700 is shown in FIG. 7, where the extended system record is used to specify SID/NID to MCC mapping.

With reference once again to FIG. 4, since country-2 has two MCCs, a MLPL record is provisioned with both MCCs. This allows the ME to identify that MCC2 and MCC3 are grouped together. Since the location group has country-wide scope, identifying the current location group is equivalent to identifying the current MCC-group. If a 3GPP system is discovered, the MCC associated with its PLMN will help the ME identify the location group. If instead a 3GPP2 system is discovered and is listed in the PRL, the system record will allow the ME to identify its current location group.

Figure 6:
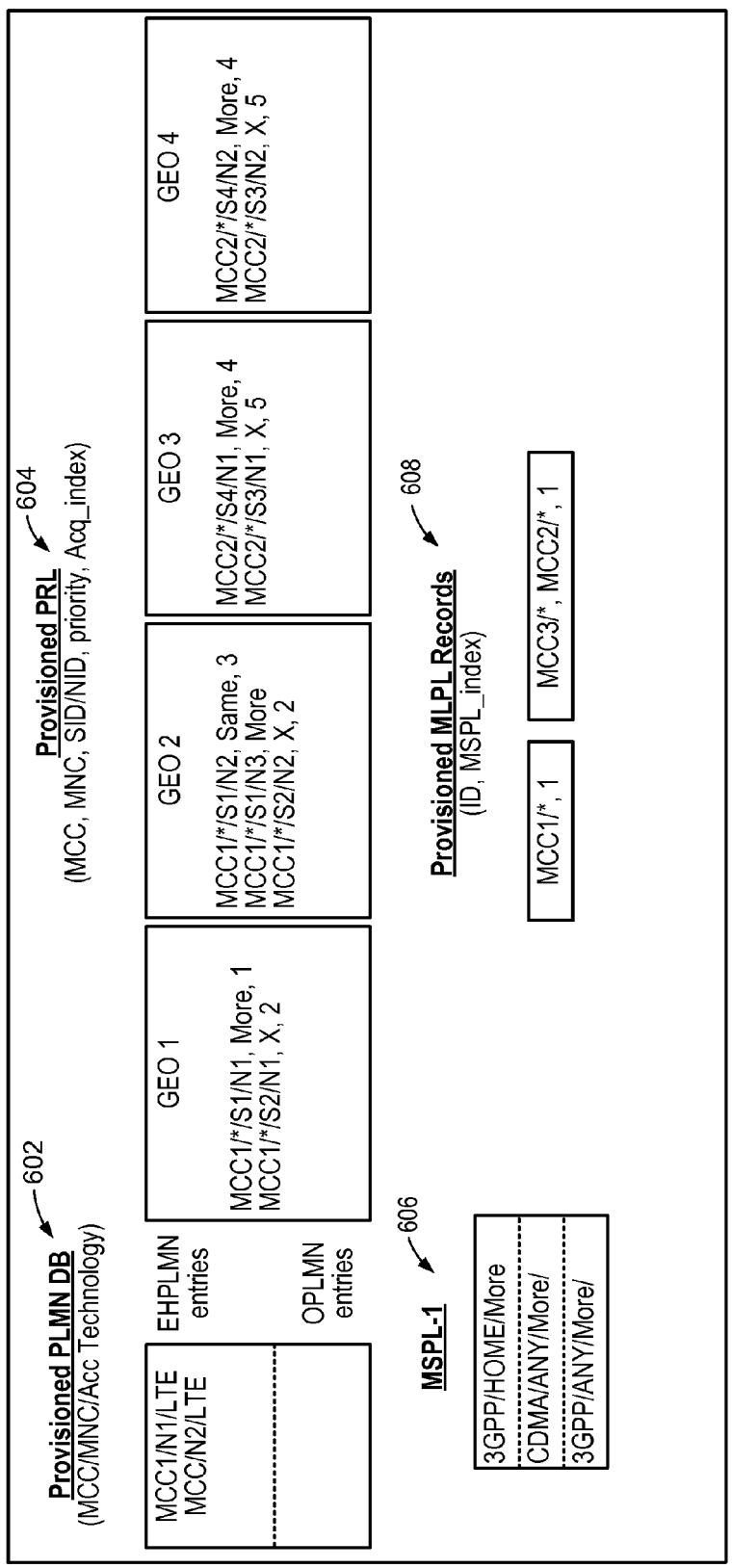
FIG. 6 illustrates exemplary tables provisioned in a mobile entity.

For instance, suppose the ME is provisioned with the databases in FIG. 6. If the ME discovers the 3GPP system MCC1/N1, it determines that it is in location group 502 in FIG. 5. In addition, since this MLPL record is linked to MSPL-1, the ME determines that the MSPL to use is MSPL-1. Using the provisioned MLPL records and the GEOs that belong to the location group, the ME determines that the other systems in the location group are S1/N1, S1/N2, S1/N3, S2/N1, and S2/N2. Based on the rules in MSPL-1 the ME determines that it has already discovered the most preferred system in the location group and stops scanning for other systems.

Suppose instead the ME first discovers the C2K system S1/N1. Using the provisioned PRL record it determines that it is in location group 502. The ME also determines that the other systems in the same location group are S2/N1 and MCC1/N1. Based on the rules of the MSPL associated with the location group, it determines that it has not discovered the most preferred system available in the location group and performs scans for MCC1/N1 in the LTE bands.

Finally, suppose the ME first discovers the C2K system S3/N1. Using the provisioned PRL record it determines that it is in location group 504. The ME also determines that the other systems in the same location group are S4/N1 and MCC2/N2. Based on the rules of the MSPL associated with the location group, the ME determines that it has not discovered the most preferred system available in the location group and performs scans for MCC2/N2 in the LTE bands.

In related aspects, there is provided an embodiment wherein the location groups are more fine-grained in terms of geography, such as when SID-based MLPL records are provisioned. For example, as shown in FIG. 4, country-1 can be split into two location groups 402 and 404, one without LTE present and one with LTE. When in country-1 the provisioning will allow the ME to differentiate between whether it is in location group 402 or 404. If the ME determines it is in location group 402, it can determine that there are no LTE systems in the same location group and hence it can avoid scanning for LTE systems.

Figure 8:
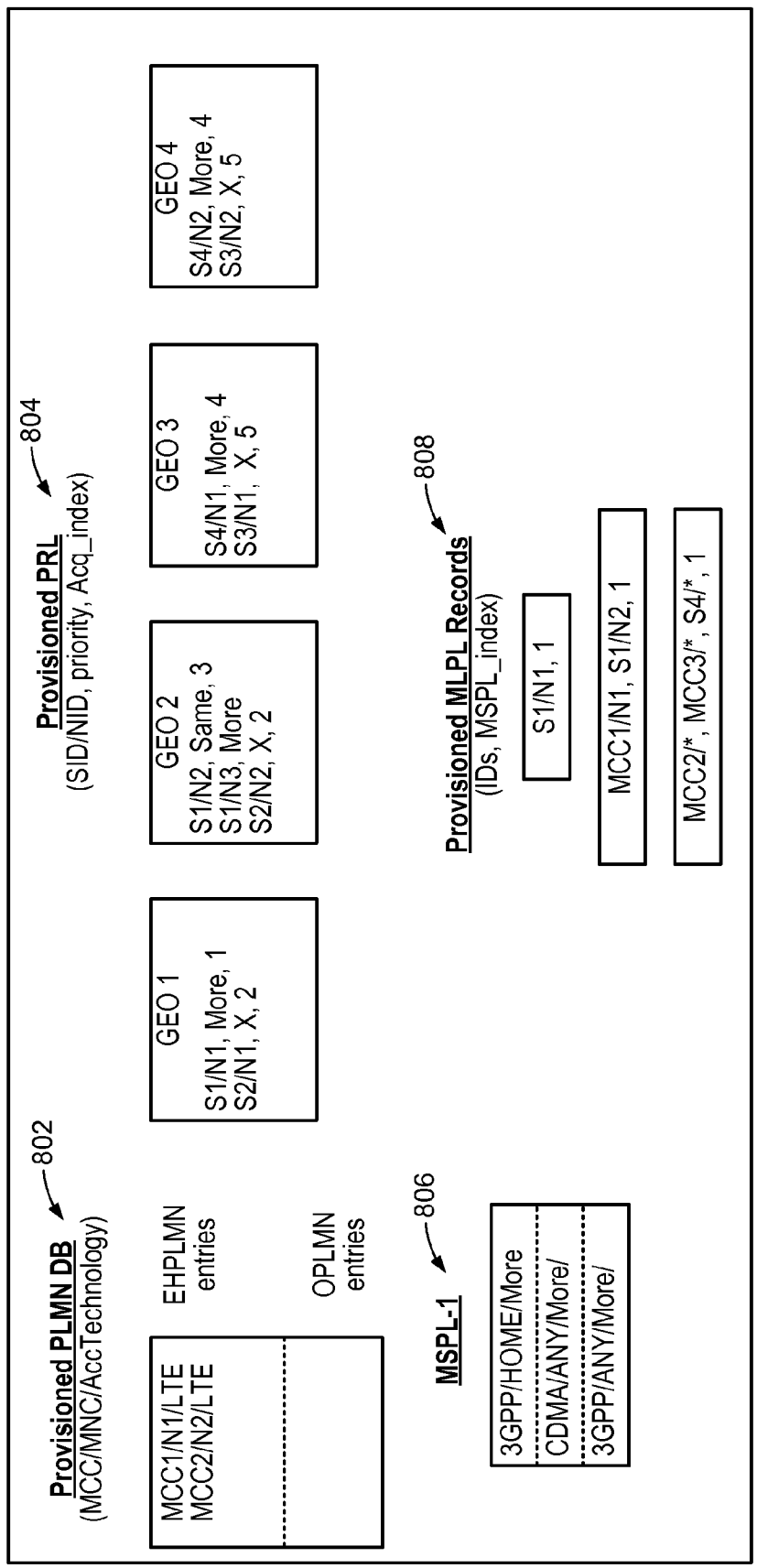
FIG. 8 illustrates exemplary tables provisioned in a mobile entity to define finer location groups.

Exemplary tables that may be provisioned in the ME are shown in FIG. 8, which may include a provisioned PLMN database 802, a provisioned PRL 804, a MSPL-1 806, and provisioned MLPL records 808 or similar system priority list records. The main differences between the provisioning in case of FIG. 8 and that in case of FIG. 6 are that: (a) the MLPL records contain at least one SID/NID from each GEO that belongs to the location group; (b) if there is no preferred 3GPP system in the same location as the C2K system, the MLPL record just has the SID/NID field; and (c) the extended PRL is not needed.

Suppose the ME discovers that the 3GPP system MCC1/N1, and determines that it is in location group 404. In addition, since this MLPL record is linked to MSPL-1, the ME determines that the MSPL to use is MSPL-1. Using the provisioned MLPL records and the GEOs that belong to the location group, the ME determines that the other systems in the location group are S1/N2, S1/N3, and S2/N2. Based on the rules in MSPL-1, the ME determines that it has already discovered the most preferred system in the location group and stops scanning for other systems.

Suppose instead that the ME first discovers the C2K system S1/N1. Using the provisioned MLPL record it determines that it is in location group 402. The ME also determines that the other system in the same location group is S2/N1 and that the associated MSPL is MSPL-1. Based on the rules of the MSPL associated with the location group, the ME determines that it has already discovered the most preferred system in its current location group and does not scan for other systems.

Finally, suppose the ME first discovers the C2K system S3/N1. Using the provisioned MLPL record and PRL, the ME determines that it is in location group 406. Note that although S3/N1 does not have a MLPL record, the ME is able to determine the location group because S3/N1 is in the same GEO as S4/N1 which has a matching MLPL record (S4/*). The ME also determines that the other systems in the same location group are S4/N1 and MCC2/N2. Based on the rules of the MSPL associated with the location group, the ME determines that it has not discovered the most preferred system available in the location group and performs scans for MCC2/N2 in the LTE bands.

In accordance with one or more aspects of the particular subject of this disclosure, upon powering-up, a ME might not be within the coverage of the most preferred system according to the MMSS provisioning. In such a scenario, the ME may camp on the best system it can find. In order to move to the most preferred system when it becomes available, the ME executes scans at certain times when it is idle on the current camped system. This aspect of the MMSS framework is referred to as Better System Reselection (BSR) scans. Ideally, the BSR algorithm scans for the preferred system when it becomes available. Otherwise, the power spent for the BSR scan will be wasteful, as the preferred system is not available for acquisition. A goal of multi-mode system selection is to achieve minimal acquisition time of the preferred system with minimal power spent in forming BSR scans (i.e., highly efficient use of power by the ME). Stated another way, the BSR algorithm should strike a balance between minimizing acquisition time and minimizing the power spent during BSR.

It is noted that under the 3GPP2 MMSS framework, the MSPL may include a high_pri_search_timer field, or the like, to determine the periodic interval at which the ME should look for a more preferred system. This timer may be specified for each MSPL entry and could potentially be different based on the system that the ME is camped on. Configuring a different timer for each system may increase the provisioning complexity for operators, as well as memory requirements. Hence, in one embodiment, a multi-mode system selection technique may involve using a default or defined timer for when the BSR scans are performed, and thereby reduce the provisioning size and complexity. In related aspects, if the operator needs to provision a timer value while camping on certain systems, the operator can override the default timer by specifying the timer field only for these MSPL entries.

In another embodiment, a telescopic timer may be used to scan for more preferred systems, in lieu of a fixed periodic timer. The use of flexible times between BSR scans may allow the ME to avoid scans when there is a high probability that the ME has not moved enough since the last scan to have come under preview of the more preferred system. For example, determination of whether the ME has moved may be based on: whether the cell in the serving system has changed; Global Positioning System (GPS) information; and/or information from movement sensors, such as, for example, accelerometers, voltage-controlled oscillator (VCO) accumulators, or the like.

In related aspects, the frequency of BSR scans may be increased when the conditions indicate that the ME is approaching a more preferred system. This may involve remembering a signature of the last time the more preferred system was acquired, and/or analyzing neighbor list messages, or the like, being sent over the serving system. In essence, new triggering events or conditions (e.g., based at least in part on a current location or movement of a given ME) may be defined to adjust (i.e., increase or decrease) the timer between BSR scans.

It is noted that the MMSS framework may include multiple databases that specify the relative priority between systems. In addition to moving between two systems through the MMSS framework, the cell reselection procedures at the RAN level may also cause a ME to move between two systems. As a result, it is possible that the ME may end up in a system selection loop where it ping-pongs between two systems. As such, in yet another embodiment, the multi-mode system selection technique may involve detecting and breaking such loops. For example, such a technique may involve caching the N previous systems the ME has visited within a defined time period (e.g., in the previous M minutes), and/or avoiding at least one of a given frequency and a given cell associated with at least one of the previous systems, during a preferred system scan.

It is further noted that one of the factors that results in the decreasing the power-up acquisition time is determining the correct scan order list at power up of the ME. The scan order list may specify the frequencies that are to be scanned at initial power-up. Accordingly, in still another embodiment, the multi-mode system selection technique may involve ordering or prioritizing the set of frequencies that are scanned initially by the ME during power-up. For example, such a technique may involve implanting a country-based grouping wherein the scan frequency list is ordered based on the location of the most recently used system, and/or using the scan frequency listing that is most optimal for the region in which the mobile is most often expected to operate in.

It is additionally noted that when a ME is operating on a C2K RAT, the ME may enter 1x/DO hybrid mode. Existing MMSS frameworks do not adequately address 1x/DO hybrid mode behavior of MEs. Hence, if the operator does not follow certain provisioning guidelines, the ME could end up stuck in the system selection rules. For example, suppose the MSPL is provisioned as DO-HOME>UMTS-HOME>1x-HOME>other RATs. When the three systems (i.e., DO-HOME, UMTS-HOME, and 1x-HOME) are available the ME will end up camping on the DO system initially. Since the ME is designed to enter hybrid mode while on a C2K RAT, the ME will look for all available 1x systems. Since, 1x-HOME is available it will acquire this 1x system.

A problem may arise when 1x-HOME and DO-HOME are not associated with each other. Here, the ME will actually detach itself from the acquired DO network and look for the DO networks associated with the 1x system. The ME may end up camping on 1x-HOME and one of its associated DO systems (if available). The ME may scan for UMTS-HOME, as well as DO-HOME, leading to possible loops. In addition, if 1x-HOME and DO-HOME are associated with each other, the ME may camp on both systems in hybrid mode. However, due to the configuration of a typical MSPL, one should determine whether the ME needs to execute scans for UMTS-HOME. One approach is not to execute scans for UMTS-HOME since this will lead to a loop.

If the operator desires the ME to operate in 1x/DO hybrid mode (e.g., because not all services have been moved to eHRPD), one system selection technique may involve using provisioning rules that avoid the use of RAT specific system type fields (e.g., SYS_TYPE) or the like in the MSPL. In addition, the system selection technique may involve using generic 3GPP2 records in the MSPL to avoid system selection loops that may otherwise result when the ME operates in 1x/DO hybrid mode.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, component, etc.). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 9:
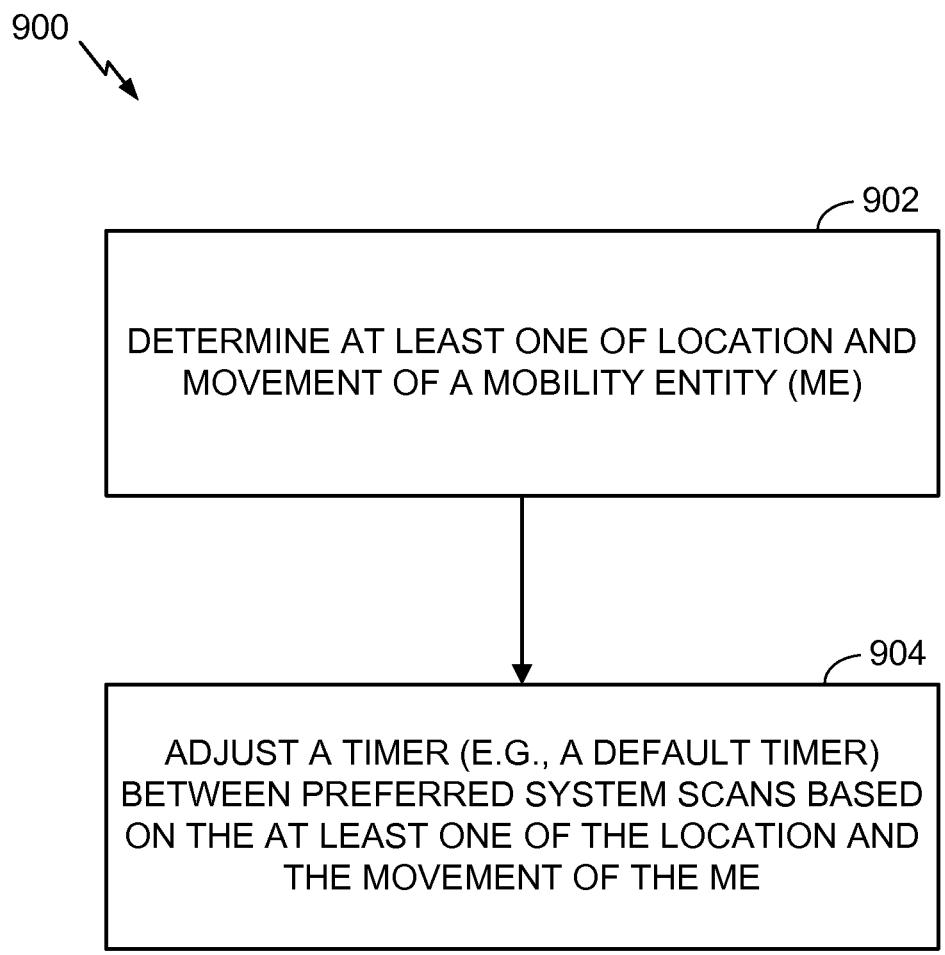
FIG. 9 illustrates an example methodology for optimizing the timing of multi-mode system scans.

In accordance with one or more aspects of the embodiments described herein, there are provided methods for optimizing the timing of multi-mode system scans in a wireless communication environment. With reference to FIG. 9, illustrated is a methodology 900 that may be performed at a wireless communication apparatus, such as a ME (e.g., an AT). At 902, at least one of location and movement of a ME is determined. At 904, a timer (e.g., a default or predefined timer) between preferred system scans is adjusted based on the at least one of the location and the movement of the ME.

Figure 10:
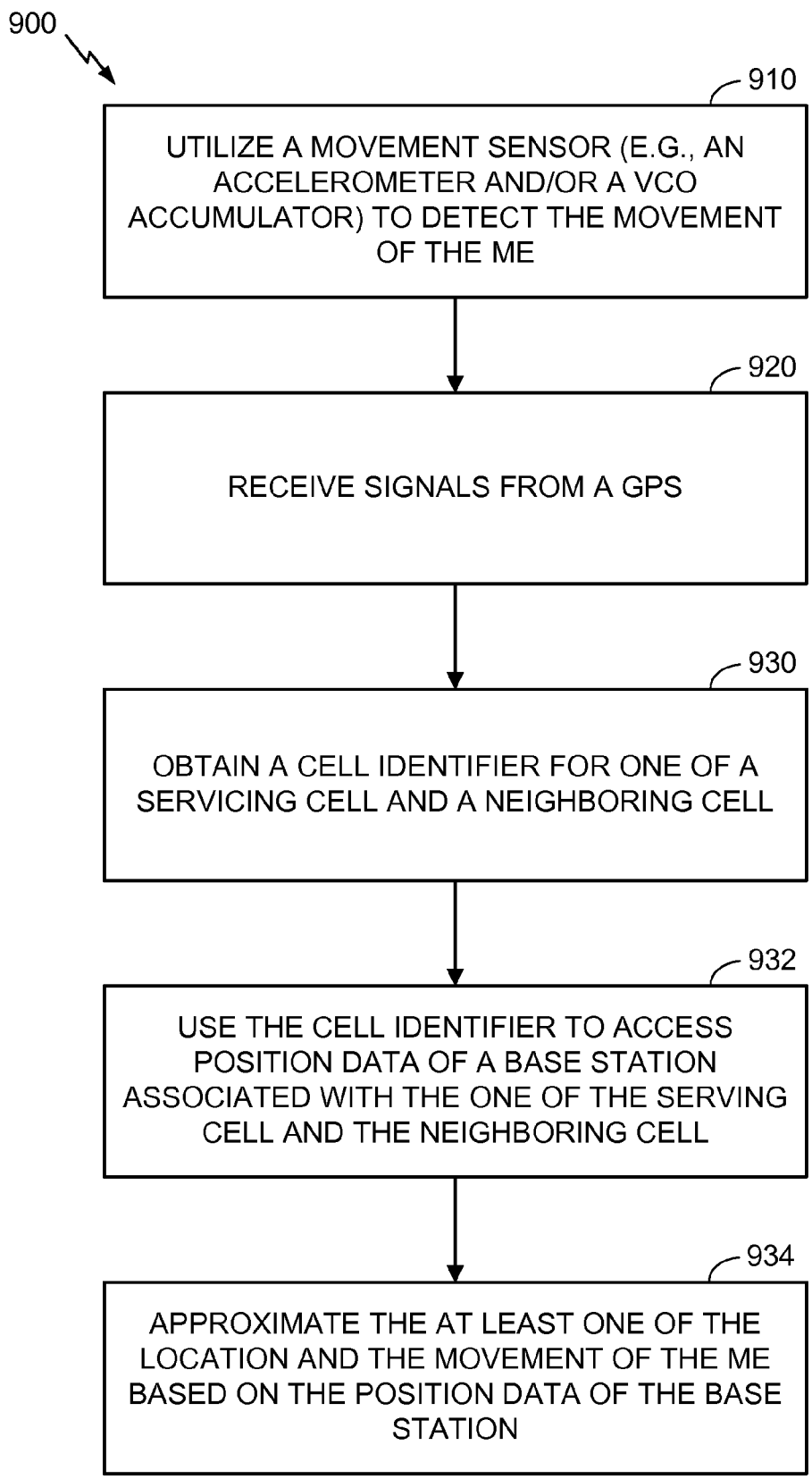
FIGS. 10-13 illustrate further aspects of the methodology of FIG. 9.

With reference to FIG. 10, determining may comprise, at 910, utilizing a movement sensor (e.g., an accelerometer and/or a voltage-controlled oscillator (VCO) accumulator) to detect the movement of the ME. In the alternative, or in addition, determining may comprise, at 920, receiving GPS signals. In the alternative, or in addition, determining may comprise: obtaining a cell identifier for one of a servicing cell and a neighboring cell (930); using the cell identifier to access position data of a base station associated with the one of the serving cell and the neighboring cell (932); and approximating the at least one of the location and the movement of the ME based on the position data of the base station (934).

Figure 11:
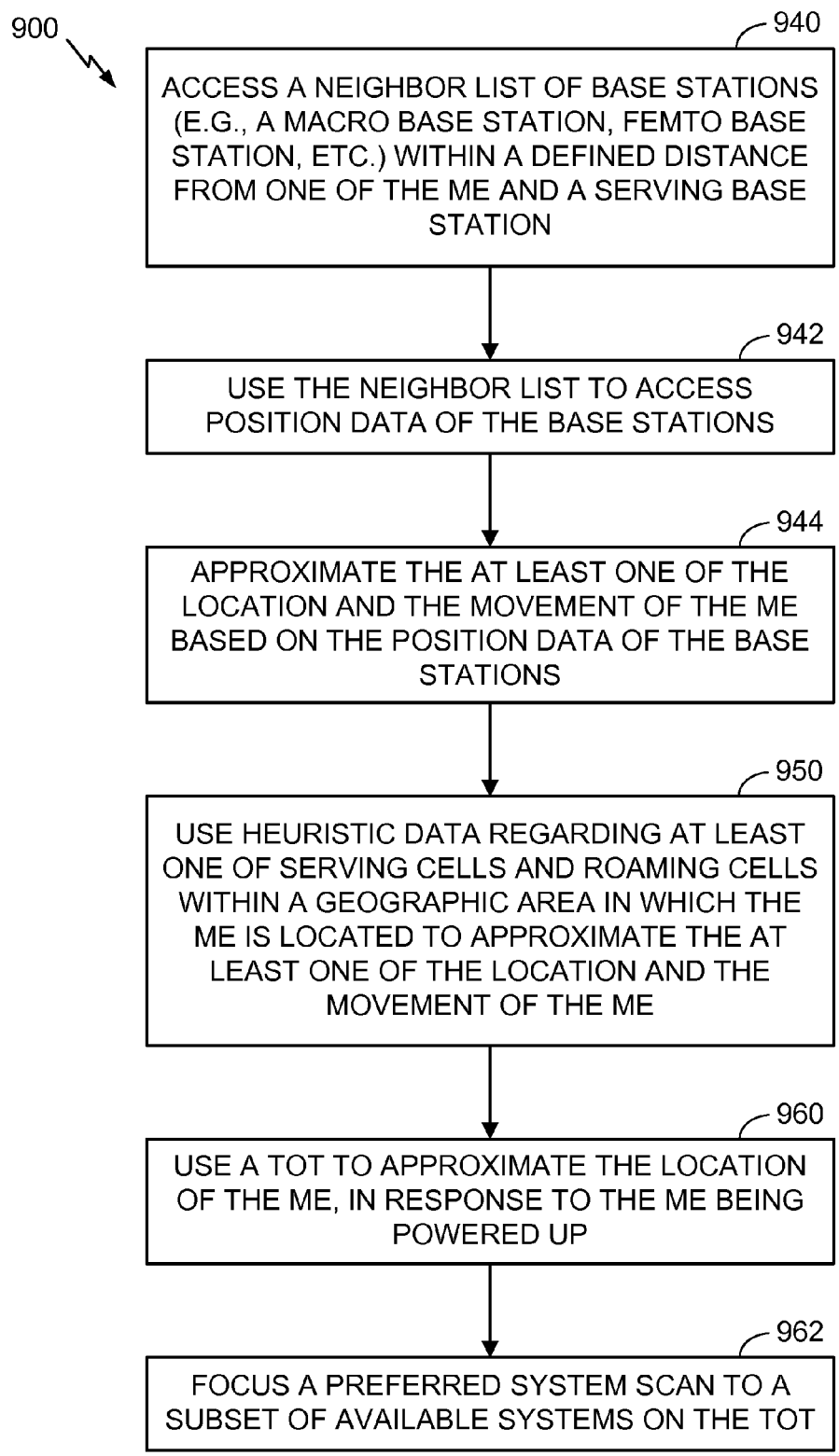

With reference to FIG. 11, determining may comprise: accessing a neighbor list of base stations (e.g., a macro base station, femto base station, etc.) within a defined distance from one of the ME and a serving base station (940); using the neighbor list to access position data of the base stations (942); and approximating the at least one of the location and the movement of the ME based on the position data of the base stations (944). In the alternative, or in addition, determining may comprise, at 950, using heuristic data regarding at least one of serving cells and roaming cells within a geographic area in which the ME is located to approximate the at least one of the location and the movement of the ME. In the alternative, or in addition, determining may comprise, at 960, using a Technology Order Table (TOT) to approximate the location of the ME, in response to the ME being powered up. Determining may further comprise, at 962, focusing a preferred system scan to a subset of available systems on the TOT.

Figure 12:
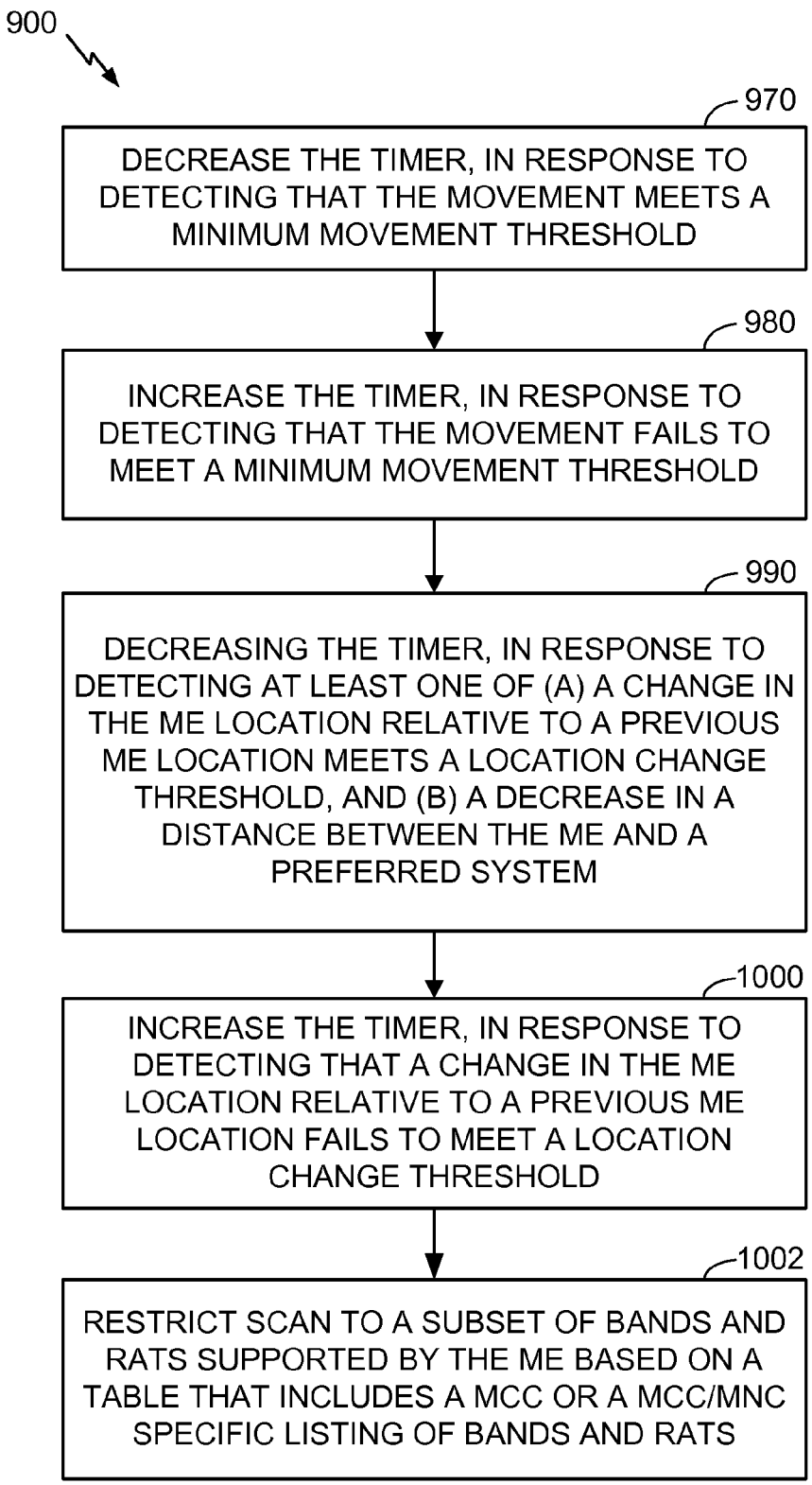

With reference to FIG. 12, adjusting may comprise, at 970, decreasing the timer, in response to detecting that the movement meets a minimum movement threshold. In the alternative, or in addition, adjusting may comprise, at 980, increasing the timer, in response to detecting that the movement fails to meet a minimum movement threshold. In the alternative, or in addition, adjusting may comprise, at 990, decreasing the timer, in response to detecting at least one of (a) a change in the ME location relative to a previous ME location meets a location change threshold, and (b) a decrease in a distance between the ME and a preferred system. The previous ME location may correspond to where the ME was when the previous preferred system was acquired. In the alternative, or in addition, adjusting may comprise, at 1000, increasing the timer, in response to detecting that a change in the ME location relative to a previous ME location fails to meet a location change threshold. It is noted that the method 900 may involve, at 1002, restricting a given preferred system scan to a subset of bands and/or RATs supported by the ME based on a table that includes a MCC or a MCC/MNC specific listing of the bands and/or the RATs.

Figure 13:
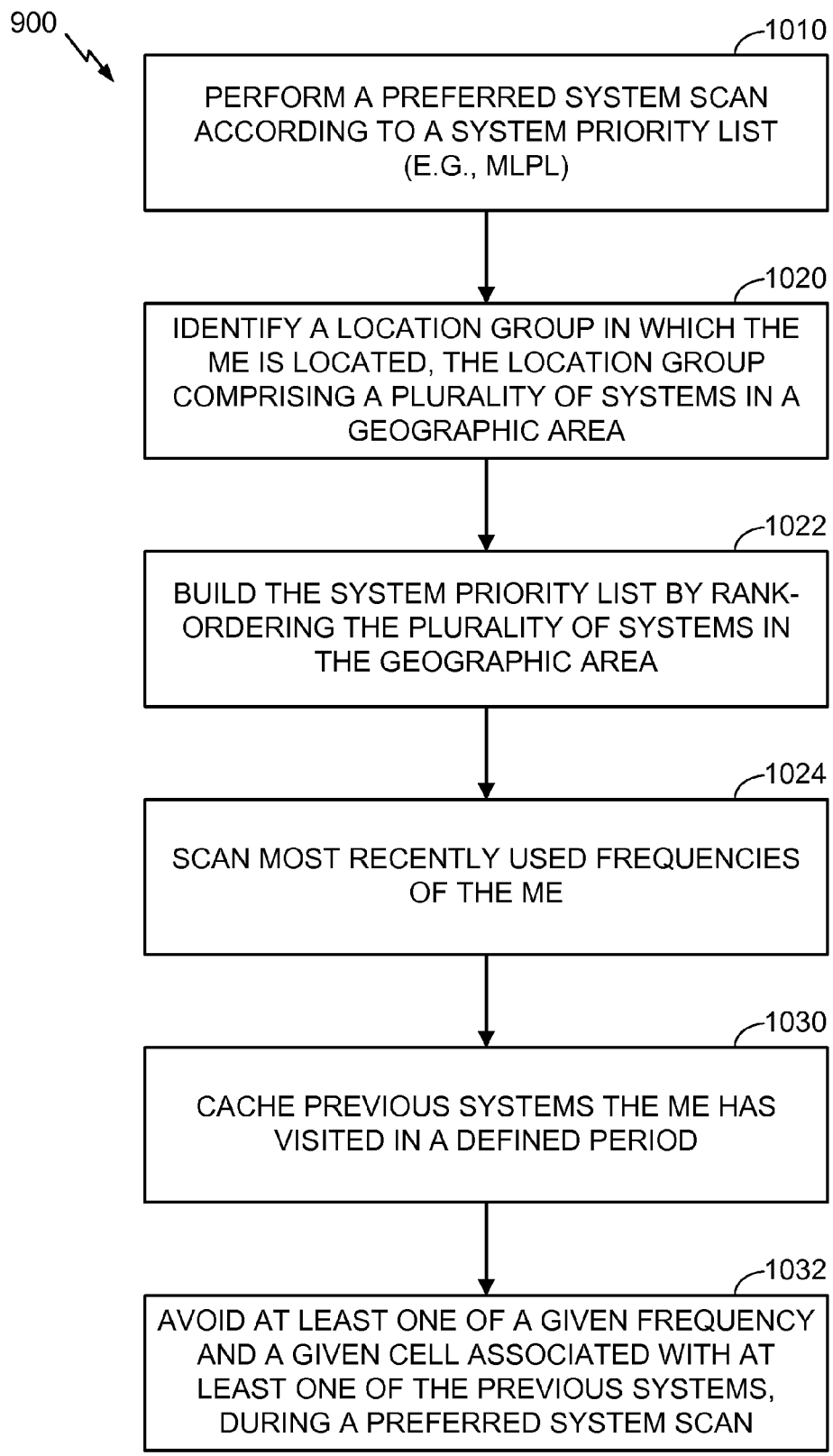

With reference to FIG. 13, the method 900 may involve, at 1010, performing a preferred system scan according to a system priority list. Performing may comprise, at 1020, identifying a location group in which the ME is located, the location group comprising a plurality of systems in a geographic area. Performing may further comprise, at 1022, building the system priority list by rank-ordering the plurality of systems in the geographic area. Identifying may comprise, at 1024, scanning most recently used frequencies of the ME. In addition, the method 900 may involve caching previous systems the ME has visited in a defined period (1030), and avoiding at least one of a given frequency and a given cell associated with at least one of the previous systems, during a preferred system scan (1032).

Figure 14:
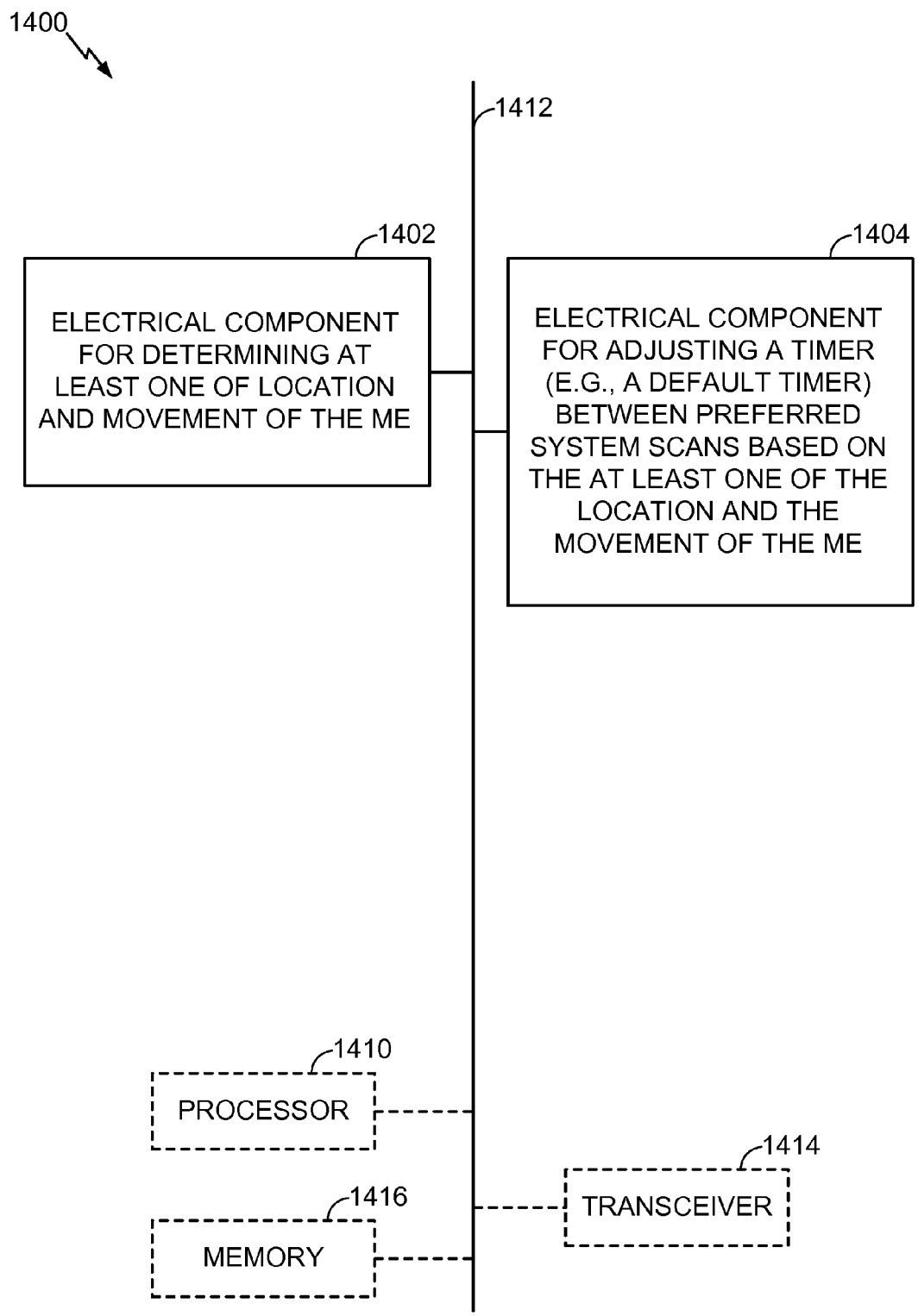
FIG. 14 shows an exemplary apparatus for optimizing the timing of multi-mode system scans.

In accordance with one or more aspects of the embodiments described herein, there are provided devices and apparatuses for optimizing the timing of multi-mode system scans. With reference to FIG. 14, there is provided an exemplary apparatus 1400 that may be configured as a ME, or as a processor or similar device for use within the ME. As depicted, the apparatus 1400 may include functional blocks that can represent functions implemented by a processor, software, or combination thereof (e.g., firmware). As illustrated, in one embodiment, the apparatus 1400 may comprise an electrical component or a module 1402 for determining at least one of location and movement of the ME. The apparatus 1400 may comprise an electrical component 1404 for adjusting a timer (e.g., a default or predefined timer) between preferred system scans based on the at least one of the location and the movement of the ME.

In related aspects, the apparatus 1400 may optionally include a processor component 1410 having at least one processor, in the case of the apparatus 1400 configured as a communication network entity, rather than as a processor. The processor 1410, in such case, may be in operative communication with the components 1402-1404 via a bus 1412 or similar communication coupling. The processor 1410 may effect initiation and scheduling of the processes or functions performed by electrical components 1402-1404.

In further related aspects, the apparatus 1400 may include a radio transceiver component 1414. A stand alone receiver and/or stand alone transmitter may be used in lieu of or in conjunction with the transceiver 1414. The apparatus 1400 may optionally include a component for storing information, such as, for example, a memory device/component 1416. The computer readable medium or the memory component 1416 may be operatively coupled to the other components of the apparatus 1400 via the bus 1412 or the like. The memory component 1416 may be adapted to store computer readable instructions and data for effecting the processes and behavior of the components 1402-1404, and subcomponents thereof, or the processor 1410, or the methods disclosed herein. The memory component 1416 may retain instructions for executing functions associated with the components 1402-1404. While shown as being external to the memory 1416, it is to be understood that the components 1402-1404 can exist within the memory 1416.

Figure 15:
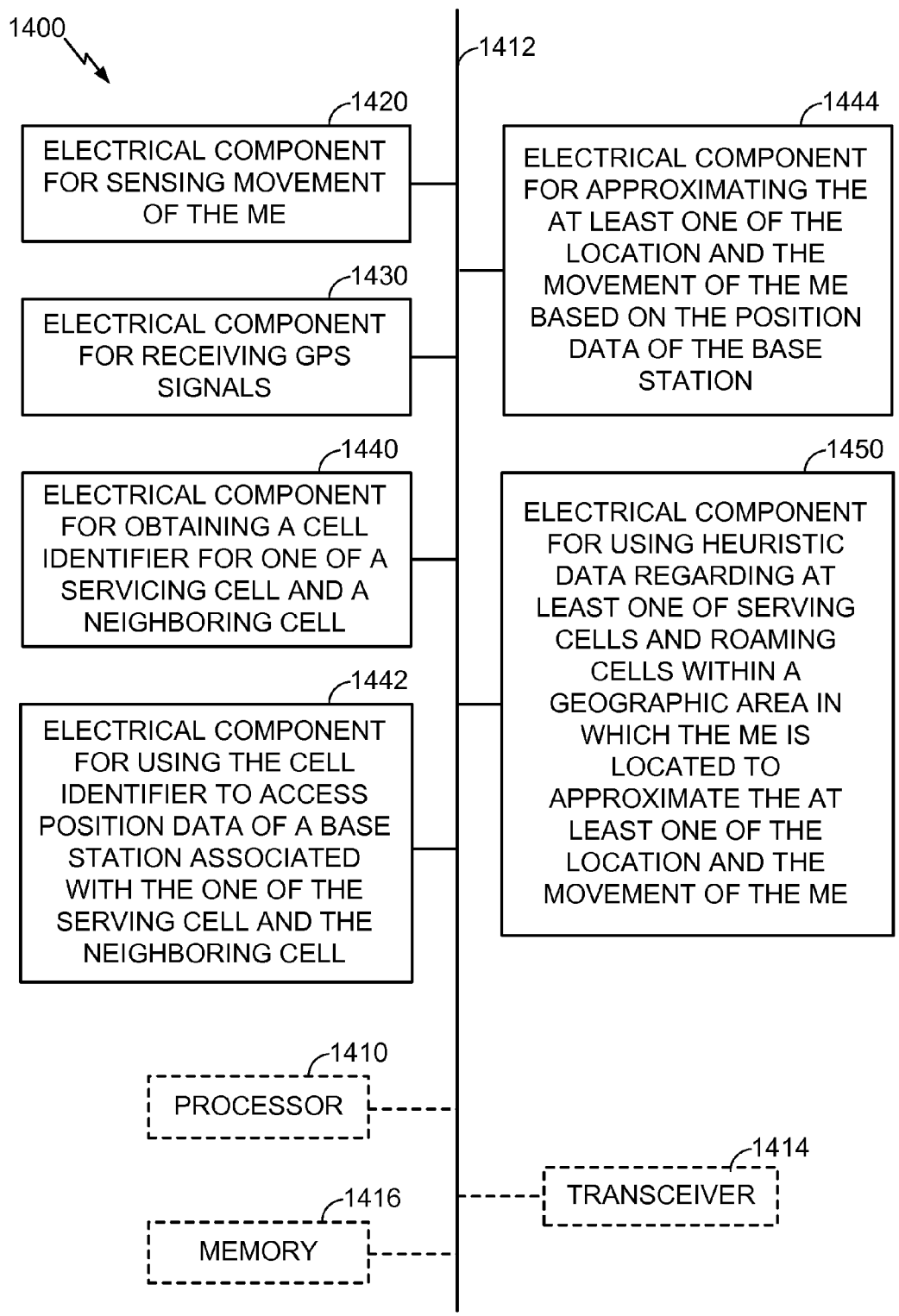
FIGS. 15-16 illustrate further aspects of the apparatus of FIG. 14.

With reference to FIG. 15, the apparatus 1400 may comprise an electrical component 1420 for sensing movement of the ME. The apparatus 1400 may comprise an electrical component 1430 for receiving GPS signals. The apparatus 1400 may comprise: an electrical component 1440 for obtaining a cell identifier for one of a servicing cell and a neighboring cell; an electrical component 1442 for using the cell identifier to access position data of a base station associated with the one of the serving cell and the neighboring cell; and an electrical component 1444 for approximating the at least one of the location and the movement of the ME based on the position data of the base station. The apparatus 1400 may comprise an electrical component 1450 for using heuristic data regarding at least one of serving cells and roaming cells within a geographic area in which the ME is located to approximate the at least one of the location and the movement of the ME.

Figure 16:
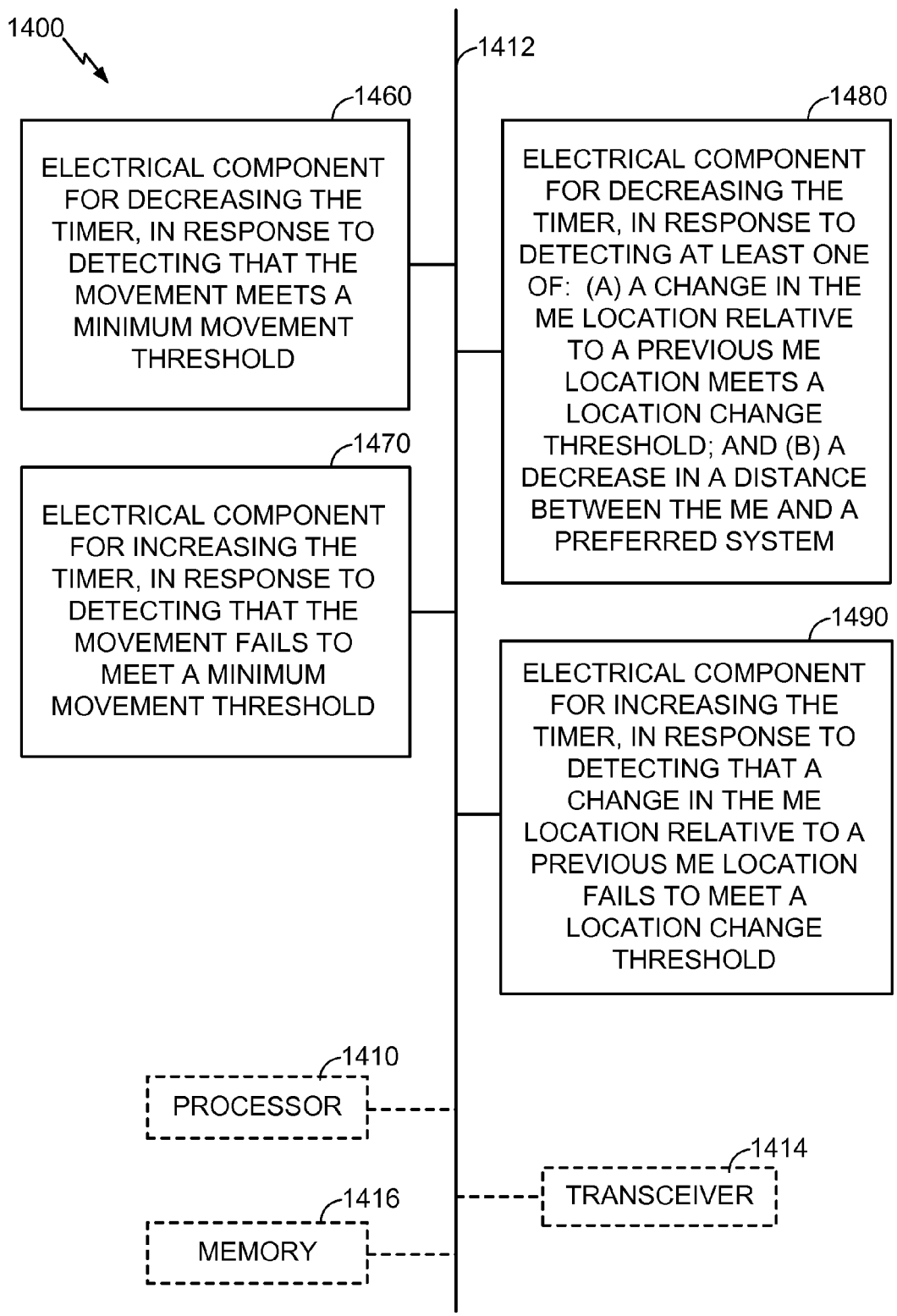

With reference to FIG. 16, the apparatus 1400 may comprise an electrical component 1460 for decreasing the timer, in response to detecting that the movement meets a minimum movement threshold. The apparatus 1400 may comprise an electrical component 1470 for increasing the timer, in response to detecting that the movement fails to meet a minimum movement threshold. The apparatus 1400 may comprise an electrical component 1480 for decreasing the timer, in response to detecting at least one of: (a) a change in the ME location relative to a previous ME location meets a location change threshold; and (b) a decrease in a distance between the ME and a preferred system. The apparatus 1400 may comprise an electrical component 1490 for increasing the timer, in response to detecting that a change in the ME location relative to a previous ME location fails to meet a location change threshold.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes Compact Disc (CD), laser disc, optical disc, Digital Versatile Disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method operable by a mobile entity in a wireless communication system, comprising:
    determining at least one of a location of the mobile entity, a movement of the mobile entity, or any combination thereof;
    adjusting a timer between preferred system scans based on the at least one of the location of the mobile entity, the movement of the mobile entity, or any combination thereof, wherein the preferred system scans are terminated when a most preferred system is discovered;
    caching previous systems the mobile entity has visited in a defined period prior to a current preferred system scan of the preferred system scans; and
    avoiding at least one of a given frequency associated with at least one of the previous systems, a given cell associated with at least one of the previous systems, or any combination thereof during the current preferred system scan.

2. The method of claim 1, wherein determining comprises utilizing a movement sensor to detect the movement of the mobile entity.

3. The method of claim 2, wherein the movement sensor comprises at least one of an accelerometer, a voltage-controlled oscillator accumulator, or any combination thereof.

4. The method of claim 1, wherein determining comprises receiving signals from a global positioning system.

5. The method of claim 1, wherein determining comprises:
    obtaining a cell identifier for one of a servicing cell and a neighboring cell;
    using the cell identifier to access position data of a base station associated with the one of the serving cell and the neighboring cell; and
    approximating the at least one of the location of the mobile entity, the movement of the mobile entity, or any combination thereof based on the position data of the base station.

6. The method of claim 1, wherein determining comprises:
    accessing a neighbor list of base stations within a defined distance from one of the mobile entity and a serving base station;
    using the neighbor list to access position data of the base stations; and
    approximating the at least one of the location of the mobile entity, the movement of the mobile entity, or any combination thereof based on the position data of the base stations.

7. The method of claim 6, wherein base stations comprise at least one of a macro base station, a femto base station, or any combination thereof.

8. The method of claim 1, wherein determining comprises using heuristic data regarding at least one of serving cells within a geographic area in which the mobile entity is located, roaming cells within the geographic area in which the mobile entity is located, or any combination thereof to approximate the at least one of the location and the movement of the mobile entity.

9. The method of claim 1, wherein determining comprises using a technology order table to approximate the location of the mobile entity, in response to the mobile entity being powered up.

10. The method of claim 9, further comprising focusing a preferred system scan to a subset of available systems on the technology order table.

11. The method of claim 1, wherein adjusting comprises decreasing the timer, in response to detecting that the movement meets a minimum movement threshold.

12. The method of claim 1, wherein adjusting comprises increasing the timer, in response to detecting that the movement fails to meet a minimum movement threshold.

13. The method of claim 1, wherein adjusting comprises decreasing the timer, in response to detecting at least one of:
a change in the mobile entity location relative to a previous mobile entity location meets a location change threshold;
a decrease in a distance between the mobile entity and a preferred system;
or any combination thereof.

14. The method of claim 13, wherein the previous mobile entity location corresponds to where the mobile entity was when the previous preferred system was acquired.

15. The method of claim 1, wherein adjusting comprises increasing the timer, in response to detecting that a change in the mobile entity location relative to a previous mobile entity location fails to meet a location change threshold.

16. The method of claim 1, further comprising performing a preferred system scan according to a multimode location association priority list.

17. The method of claim 16, wherein performing comprises identifying a location group in which the mobile entity is located, the location group comprising a plurality of systems in a geographic area.

18. The method of claim 17, wherein performing further comprises building the system priority list by rank-ordering the plurality of systems in the geographic area.

19. The method of claim 17, wherein identifying comprises scanning most recently used frequencies of the mobile entity.

20. The method of claim 1, wherein the timer comprises a default timer for a plurality of available systems.

21. The method of claim 1, further comprising restricting a given preferred system scan to a subset of bands and radio access technologies supported by the mobile entity based on a table that includes a mobile country code/mobile network code specific listing of the bands and the radio access technologies.

22. An apparatus, comprising:
at least one processor configured to:
determine at least one of location of a mobile entity, movement of the mobile entity, or any combination thereof;
adjust a timer between preferred system scans based on the at least one of the location of the mobile entity, the movement of the mobile entity, or any combination thereof, wherein the preferred system scans are terminated when a most preferred system is discovered;
cache previous systems the mobile entity has visited in a defined period prior to a current preferred system scan of the preferred system scans; and
avoid at least one of a given frequency associated with at least one of the previous systems, a given cell associated with at least one of the previous systems, or any combination thereof during the current preferred system scan; and
a memory coupled to the at least one processor for storing data.

23. The apparatus of claim 22, further comprising a movement sensor to detect the movement of the mobile entity.

24. The apparatus of claim 22, further comprising a global positioning system receiver in operative communication with the at least one processor.

25. The apparatus of claim 22, wherein the at least one processor is further configured to:
obtain a cell identifier for one of a servicing cell and a neighboring cell;
use the cell identifier to access position data of a base station associated with the one of the serving cell and the neighboring cell; and
approximate the at least one of the location of the mobile entity, the movement of the mobile entity, or any combination thereof based on the position data of the base station.

26. The apparatus of claim 22, wherein the at least one processor is further configured to use heuristic data regarding at least one of serving cells within a geographic area in which the mobile entity is located, roaming cells within the geographic area in which the mobile entity is located, or any combination thereof to approximate the at least one of the location of the mobile entity, the movement of the mobile entity, or any combination thereof.

27. The apparatus of claim 22, wherein the at least one processor decreases the timer, in response to detecting that the movement meets a minimum movement threshold.

28. The apparatus of claim 22, wherein the at least one processor increases the timer, in response to detecting that the movement fails to meet a minimum movement threshold.

29. The apparatus of claim 22, wherein the at least one processor is further configured to decrease the timer, in response to detecting at least one of:
a change in the mobile entity location relative to a previous mobile entity location meets a location change threshold;
a decrease in a distance between the mobile entity and a preferred system; or
any combination thereof.

30. The apparatus of claim 22, wherein the at least one processor increases the timer, in response to detecting that a change in the mobile entity location relative to a previous mobile entity location fails to meet a location change threshold.

31. The apparatus of claim 22, wherein the at least one processor performs a preferred system scan according to a system priority list.

32. The apparatus of claim 22, wherein the timer comprises a default timer for a plurality of available systems.

33. The apparatus of claim 22, further comprising restricting a given preferred system scan to a subset of bands and radio access technologies supported by the mobile entity based on a table that includes a mobile country code or a mobile country code/mobile network code specific listing of the bands and the radio access technologies.

34. An apparatus, comprising:
means for determining at least one of location of a mobile entity, movement of the mobile entity, or any combination thereof;
means for adjusting a timer between preferred system scans based on the at least one of the location of the mobile entity, the movement of the mobile entity, or any combination thereof, wherein the preferred systems scans are terminated when a most preferred system is discovered;

means for caching previous systems the mobile entity has visited in a defined period prior to a current preferred system scan of the preferred system scans; and means for avoiding at least one of a given frequency associated with at least one of the previous systems, a given cell associated with at least one of the previous systems, or any combination thereof during the current preferred system scan.

35. The apparatus of claim 34, further comprising means for sensing the movement of the mobile entity.

36. The apparatus of claim 34, further comprising means for receiving global positioning system signals.

37. The apparatus of claim 34, further comprising:
means for obtaining a cell identifier for one of a servicing cell and a neighboring cell;
means for using the cell identifier to access position data of a base station associated with the one of the serving cell and the neighboring cell; and
means for approximating the at least one of the location of the mobile entity, the movement of the mobile entity, or any combination thereof based on the position data of the base station.

38. The apparatus of claim 34, further comprising means for using heuristic data regarding at least one of serving cells within a geographic area in which the mobile entity is located, roaming cells within the geographic area in which the mobile entity is located, or any combination thereof to approximate the at least one of the location and the movement of the mobile entity.

39. The apparatus of claim 34, further comprising means for decreasing the timer, in response to detecting that the movement meets a minimum movement threshold.

40. The apparatus of claim 34, further comprising means for increasing the timer, in response to detecting that the movement fails to meet a minimum movement threshold.

41. The apparatus of claim 34, further comprising means for decreasing the timer, in response to detecting at least one of:
a change in the mobile entity location relative to a previous mobile entity location meets a location change threshold;
a decrease in a distance between the mobile entity and a preferred system; or
any combination thereof.

42. The apparatus of claim 34, further comprising means for increasing the timer, in response to detecting that a change in the mobile entity location relative to a previous mobile entity location fails to meet a location change threshold.

43. The apparatus of claim 34, further comprising means for performing a preferred system scan according to a system priority list.

44. The computer program product comprising:
a non-transitory computer-readable medium comprising code for causing a computer to:
determine at least one of location of a mobile entity, movement of the mobile entity, or any combination thereof;
adjust a timer between preferred system scans based on the at least one of the location of the mobile entity, the movement of the mobile entity, or any combination thereof, wherein the preferred system scans are terminated when a most preferred system is discovered;
cache previous systems the mobile entity has visited in a defined period prior to a current preferred system scan of the preferred system scans; and
avoid at least one of a given frequency associated with at least one of the previous systems, a given cell associated with at least one of the previous systems, or any combination thereof during the current preferred system scan.

45. The computer program product of claim 44, wherein the non-transitory computer-readable medium further comprises code for causing the computer to sense the movement of the mobile entity.

46. The computer program product of claim 44, wherein the non-transitory computer-readable medium further comprises code for causing the computer to receive global positioning system signals.

47. The computer program product of claim 44, wherein the non-transitory computer-readable medium further comprises code for causing the computer to:
obtain a cell identifier for one of a servicing cell and a neighboring cell;
use the cell identifier to access position data of a base station associated with the one of the serving cell and the neighboring cell; and
approximate the at least one of the location of the mobile entity the movement of the mobile entity, or any combination thereof based on the position data of the base station.

48. The computer program product of claim 44, wherein the non-transitory computer-readable medium further comprises code for causing the computer to use heuristic data regarding at least one of serving cells within a geographic area in which the mobility mobile entity is located, roaming cells within a geographic area in which the mobility mobile entity is located, or any combination thereof to approximate the at least one of the location of the mobile entity, the movement of the mobile entity, or any combination thereof.

49. The computer program product of claim 44, wherein the non-transitory computer-readable medium further comprises code for causing the computer to decrease the timer, in response to detecting that the movement meets a minimum movement threshold.

50. The computer program product of claim 44, wherein the non-transitory computer-readable medium further comprises code for causing the computer to increase the timer, in response to detecting that the movement fails to meet a minimum movement threshold.

51. The computer program product of claim 44, wherein the non-transitory computer-readable medium further comprises code for causing the computer to increase the timer, in response to detecting at least one of:
a change in the mobile entity location relative to a previous mobile entity location fails to meet a location change threshold;
a decrease in a distance between the mobile entity and a preferred system; or
any combination thereof.

52. The computer program product of claim 44, wherein the non-transitory computer-readable medium further comprises code for causing the computer to increase the timer, in response to detecting that a change in the mobile entity location relative to a previous mobile entity locations fails to meet a location change threshold.

53. The computer program product of claim 44, wherein the non-transitory computer-readable medium further comprises code for causing the computer to perform a preferred system scan according to a system priority list.

* * * * *